US008184928B2

(12) United States Patent
Mrityunjay et al.

(10) Patent No.: US 8,184,928 B2
(45) Date of Patent: May 22, 2012

(54) COMBINING SEAM CARVING AN IMAGE RESIZING

(75) Inventors: Kumar Mrityunjay, Rochester, NY (US); David D. Conger, Grosse Point Woods, MI (US); Jiebo Luo, Pittsford, NY (US); Rodney L. Miller, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 198 days.

(21) Appl. No.: 12/582,110

(22) Filed: Oct. 20, 2009

(65) Prior Publication Data

US 2011/0091132 A1    Apr. 21, 2011

(51) Int. Cl.
G06K 9/32    (2006.01)
(52) U.S. Cl. ........................................ 382/298
(58) Field of Classification Search .................. 382/298, 382/162, 254, 300; 358/1.9, 3.05, 3.06
See application file for complete search history.

(56) References Cited

U.S. PATENT DOCUMENTS

| 2008/0219587 A1 | 9/2008 | Avidan et al. |
| 2008/0267528 A1 | 10/2008 | Avidan et al. |
| 2009/0180713 A1 | 7/2009 | Bucha et al. |
| 2010/0027876 A1* | 2/2010 | Avidan et al. ................. 382/162 |
| 2010/0079813 A1* | 4/2010 | Bernal et al. ................. 358/3.06 |
| 2011/0200274 A1* | 8/2011 | Luo et al. ..................... 382/300 |

OTHER PUBLICATIONS

Suh et al., "Automatic thumbnail cropping and its effectiveness." Proceedings of the 16th annual ACM symposium on User Interface Software and Technology, pp. 95-104, 2003.
Chen et al., "A visual attention model for adapting images on small displays," Multimedia Systems, vol. 9, pp. 353-364, 2003.
Santella et al., "Gaze-based interaction for semiautomatic photo cropping," ACM Human Factors in Computing Systems, pp. 771-780, 2006.
Gal et al., "Feature aware texturing," Proc. Eurographics Symposium on Rendering, 2006.
Agarwala et al., "Interactive digital photomontage," ACM Trans. Graph. vol. 23, pp. 294-302, 2004.
Jia et al., "Drag-and-drop pasting," ACM Transactions on Graphics, vol. 25, pp. 631-636, 2006.
Rother et al., "Autocollage," ACM Transactions on Graphics, vol. 25, pp. 847-852, 2006.
S. Avidan, et al., "Seam carving for content-aware image resizing," ACM Transactions on Graphics, vol. 26, No. 3, 2007.
Y. Guo et al., "Image retargeting using mesh parameterization," IEEE Transactions on Multimedia, vol. 11, pp. 856-867, 2009.
D. Simakov, et al., "Summarizing visual data using bidirectional similarity," Proc. IEEE Conference on Computer Vision and Pattern Recognition, pp. 1-8, 2008.

* cited by examiner

*Primary Examiner* — Yon Couso
(74) *Attorney, Agent, or Firm* — Kevin E. Spaulding

(57) ABSTRACT

A method for resizing an input digital image to form an output digital image with an output aspect ratio, comprising: determining a number of rows or columns that need to be reduced from the input digital image; determining an image energy map for the input digital image; repeatedly determining a seam path responsive to the image energy map and removing pixels along the determined seam path to determine the output digital image, wherein the determined seam path satisfies a constraint that a directional image gradient is less than a gradient threshold for each pixel in the seam path, until either the determined number of rows or columns has been reduced or no valid seam path can be found; and cropping or scaling the output digital image to the output aspect ratio if the determined number of rows or columns was not reduced.

12 Claims, 6 Drawing Sheets

COMBINING SEAM CARVING AN IMAGE RESIZING

CROSS REFERENCE TO RELATED APPLICATIONS

Reference is made to commonly assigned, co-pending U.S. Patent Application Publication No. 2011/0085745 published Apr. 14, 2011, entitled: "Improved Seam Carving for Image Resizing", by Kumar, et al., which is incorporated herein by reference.

FIELD OF THE INVENTION

This invention relates generally to the field of resizing digital images, and more particularly to a method to resize digital images using a seam carving algorithm.

BACKGROUND OF THE INVENTION

The rise of print and display devices ranging from tiny "thumbprints" of images often seen in selection menus, small, low resolution mobile telephone screens, slightly larger PDA screens, to large, high resolution elongated flat panel display and projector screens has made image resizing an important technique for rendering and viewing digital images. Resizing images to render them on different devices than originally intended is sometimes called image retargeting.

Conventional image retargeting typically involves image scaling and cropping. Image scaling magnifies or shrinks the size of the image to resize the image. Generally, the same scale factor is applied in both the horizontal and vertical directions, which preserves the aspect ratio of the image. Image scaling alone does not work well when the aspect ratio of the image needs to change, because applying different scale factors in the horizontal and vertical directions introduces visual distortions.

Cropping is another method to resize an image by cutting out a subset of pixels within the image. Generally, image scaling is combined with cropping when the aspect ratio of an image needs to be changed. In this case, the image is scaled so that it has the right size in one dimension, but is oversized in the other direction. The scaled image is then cropped to obtain an output image of the desired size.

Many resizing algorithms default to cropping the output image from the central portion of the input image, discarding equal portions of the input image on both edges. However, this can result in discarding important parts of the image depending on the content of the image. While cropping an image, there is a desire to maintain important features in the content of the image. This can be done with top-down or bottom-up methods. Top-down methods use tools such as face detectors to detect important regions in the image, whereas bottom-up methods rely on visual saliency methods to construct visual saliency map of the source image. After the saliency map is constructed, cropping can be used to display the most important region of the image.

One method described by Suh et al., in the article "Automatic thumbnail cropping and its effectiveness" (Proceedings of the 16th annual ACM symposium on User Interface Software and Technology, pp. 95-104, 2003) automatically generates thumbnail images based on either a saliency map or the output of a face detector. With this method, a source image is cropped to capture the most salient region in the image.

Another method taught by Chen et al. in the article "A visual attention model for adapting images on small displays" (Multimedia Systems, Vol. 9, pp. 353-364, 2003) adapts images to mobile devices. In this method, the most important region in the image is automatically detected and transmitted to the mobile device.

Santella et al., in the article "Gaze-based interaction for semiautomatic photo cropping" (ACM Human Factors in Computing Systems, pp. 771-780, 2006), which is incorporated herein by reference, use eye tracking, in addition to composition rules to crop images intelligently. In this method, a users looks at an image, while eye movements are recorded. The recordings are used to identify important image content, and can then automatically crop the image to any size or aspect ratio.

All of the above rely on conventional image resizing and cropping operations to retarget of the image. These approaches are limited because it can only remove pixels from the image periphery. In some cases, there may be important image content at the edges of the image that will be lost during the cropping operation no matter how the image is cropped. More effective resizing can only be achieved by considering the image content as a whole, in conjunction with geometric constraints of the output device.

Another method taught by Gal et al. in the article "Feature aware texturing" (Proc. Eurographics Symposium on Rendering, 2006) uses a feature-aware texture mapping that warps an image to a new shape, while preserving user-specified regions. This is accomplished by solving a particular formulation of the Laplace editing technique suited to accommodate similarity constraints in images. However, local constraints are propagated through the entire image to accommodate all constraints at once, and may sometimes fail.

Another method taught by Agarwala et al. in the article "Interactive digital photomontage" (ACM Trans. Graph. Vol. 23, pp. 294-302, 2004) composes a novel photomontage from several images. A user selects ROIs from different input images, which are then composited into an output image.

One rather elegant content-aware image retargeting algorithm called "seam carving" has been described by S. Avidan and A. Shamir in U.S. Patent Application Publication 2008/0219587, entitled "Method for retargeting images." The seam carving technique provides a way to systematically remove pixels from visually "unimportant" paths ("seams") through an image, effectively reducing the height or width by one pixel at a time, in a relatively unnoticeable way. Similarly, pixels can be added to these paths to achieve an increase in the dimension. However, this approach fails if seam passes through the important objects in the image.

Another method using mesh parameterization has been described by Y. Guo et al. in the article "Image retargeting using mesh parameterization," (IEEE Transactions on Multimedia, Vol. 11, pp. 856-867, 2009). In this approach, a mesh image representation that is consistent with the underlying image structures is constructed for image retargeting. This technique requires processing an entire image at once which may be too complex and too costly for many applications.

Another method described by D. Simakov, et al. in the article "Summarizing visual data using bidirectional similarity" (Proc. IEEE Conference on Computer Vision and Pattern Recognition, pp. 1-8, 2008) uses a similarity measure. In this approach, an image similarity measure is optimized for image retargeting. This technique requires processing an entire image at once which may be too complex and too costly for many applications.

Thus, there exists a need for content-aware image retargeting that preserves salient features of an image even under arbitrary changing of the aspect ratio.

SUMMARY OF THE INVENTION

A method for resizing an input digital image with an input aspect ratio to form an output digital image with an output aspect ratio, comprising using a processor to perform the steps of:

a) determining a number of rows or columns that need to be reduced from the input digital image to form an output digital image with the output aspect ratio;

b) selecting either a horizontal seam direction when the number of rows needs to be reduced or a vertical seam direction when the number of columns needs to be reduced;

c) determining an image energy map for the input digital image;

d) defining a gradient threshold;

e) repeatedly determining a seam path responsive to the image energy map and removing pixels along the determined seam path to determine the output digital image, wherein the determined seam path satisfies a constraint that a directional image gradient computed in a direction perpendicular to either the seam path or the seam direction is less than the gradient threshold for each pixel in the seam path, until either the determined number of rows or columns has been reduced or no valid seam path can be found which satisfies the constraint; and f) cropping or scaling the output digital image to the output aspect ratio if the determined number of rows or columns was not reduced in step e).

It is an advantage that by constraining the seam path, the retargeted image preserves the salient features of the original image with improved accuracy. It is an advantage that by switching to cropping or scaling when no valid seam can be found which satisfies the constraint, the retargeted image preserves the salient features of the original image with improved accuracy.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting.

The phrase, "digital content record", as used herein, refers to any digital content record, such as a digital still image, a digital audio file, or a digital video file.

It should be noted that, unless otherwise explicitly noted or required by context, the word "or" is used in this disclosure in a non-exclusive sense.

Figure 1:
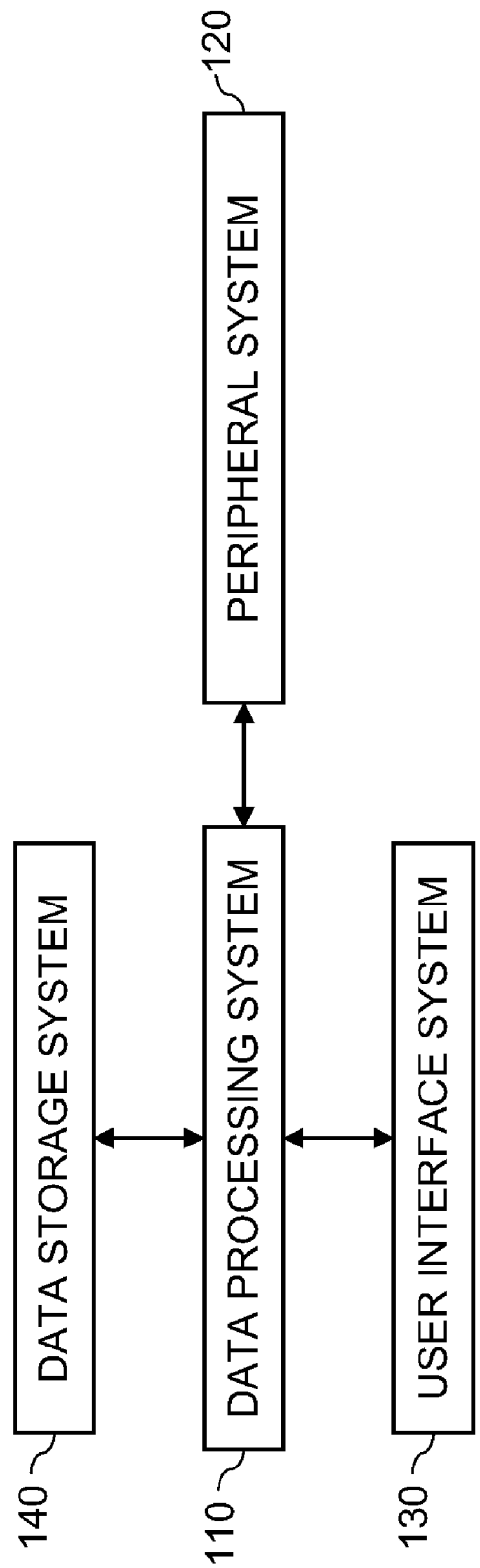
FIG. 1 is a high-level diagram showing the components of a system for retargeting digital image according to an embodiment of the present invention.

FIG. 1 is a high-level diagram showing the components of a system for image retargeting according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes of FIGS. 2-5 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes of FIGS. 2-5 described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated.

The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
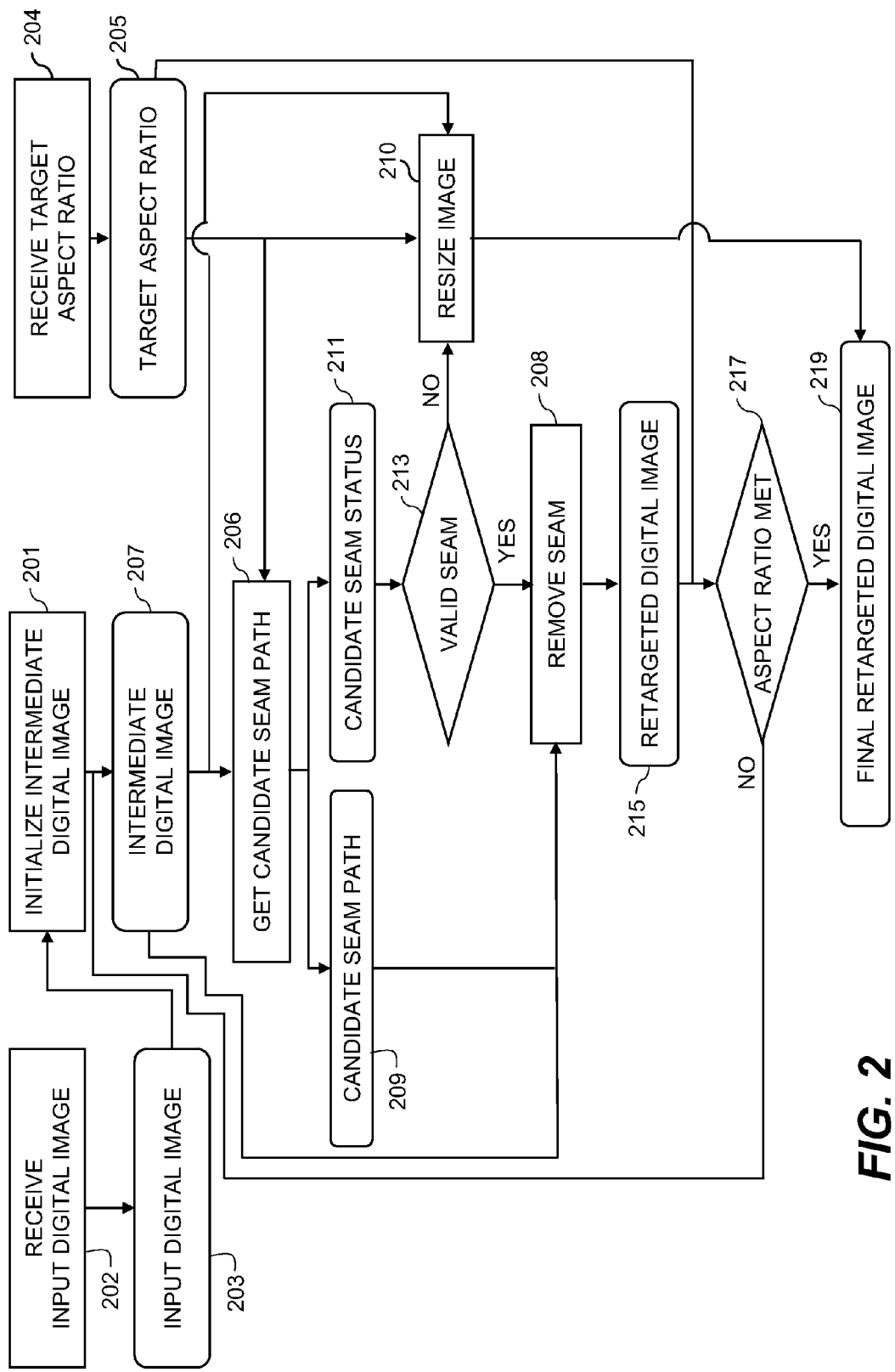
FIG. 2 is a flow diagram illustrating a method for retargeting digital images according to an embodiment of the present invention.

FIG. 2 is a flow diagram illustrating a method for retargeting digital images according to an embodiment of the present invention. An input digital image 203 representing a scene is received in receive input digital image step 202. The input digital image 203 can be captured by a digital camera or a scanner. Alternately, it may be a frame of a video sequence captured by a video camera.

Target aspect ratio 205 is received in receive target aspect ratio step 204. The target aspect ratio 205 specifies a ratio between the width and the height for a final retargeted digital image 219 that is to be produced according to the method of the present invention. The target aspect ration 205 can be used to determine a number of rows or columns of the input digital image 203 that need to be removed to achieve the target aspect ratio 205.

An initialize intermediate digital image step 201 is used to initialize an intermediate digital image 207 by setting it equal to the input digital image 203. The intermediate digital image 207 is the modified image estimated from the input digital image 203.

A get candidate seam path step 206 uses the target aspect ratio 205 and the intermediate digital image 207 to compute a candidate seam path 209 and a candidate seam status 211. The valid seam test 213 uses the candidate seam status 211 to determine whether a valid seam was identified and makes a decision whether pixels along the candidate seam path 209 will be removed or a non-seam-carving method such as image cropping or scaling will need to be used to achieve the target aspect ratio 205.

If the valid seam test 213 indicates that no valid seam was found, a resize image step 210 uses the intermediate digital image 207 and the target aspect ratio 205 to produce the final retargeted digital image 219 using a conventional non-seam-carving method such as image cropping or scaling. If the valid seam test 213 indicates that a valid seam was found, a remove seam step 208 is used to remove the pixels of the intermediate digital image 207 along the candidate seam path 209 to produce a retargeted digital image 215. An aspect ratio met step 217 is then used to check the aspect ratio of the retargeted digital image 215. If the aspect ratio of the retargeted digital image 215 satisfies the target aspect ratio 205 then the algorithm is terminated and the retargeted digital image 215 is selected as the final retargeted digital image 219. Otherwise, the intermediate digital image 207 is set to be equal to the retargeted digital image 215 and the entire process is repeated until the final retargeted digital image 219 having an aspect ratio specified by the target aspect ratio 205 is obtained.

Figure 3:
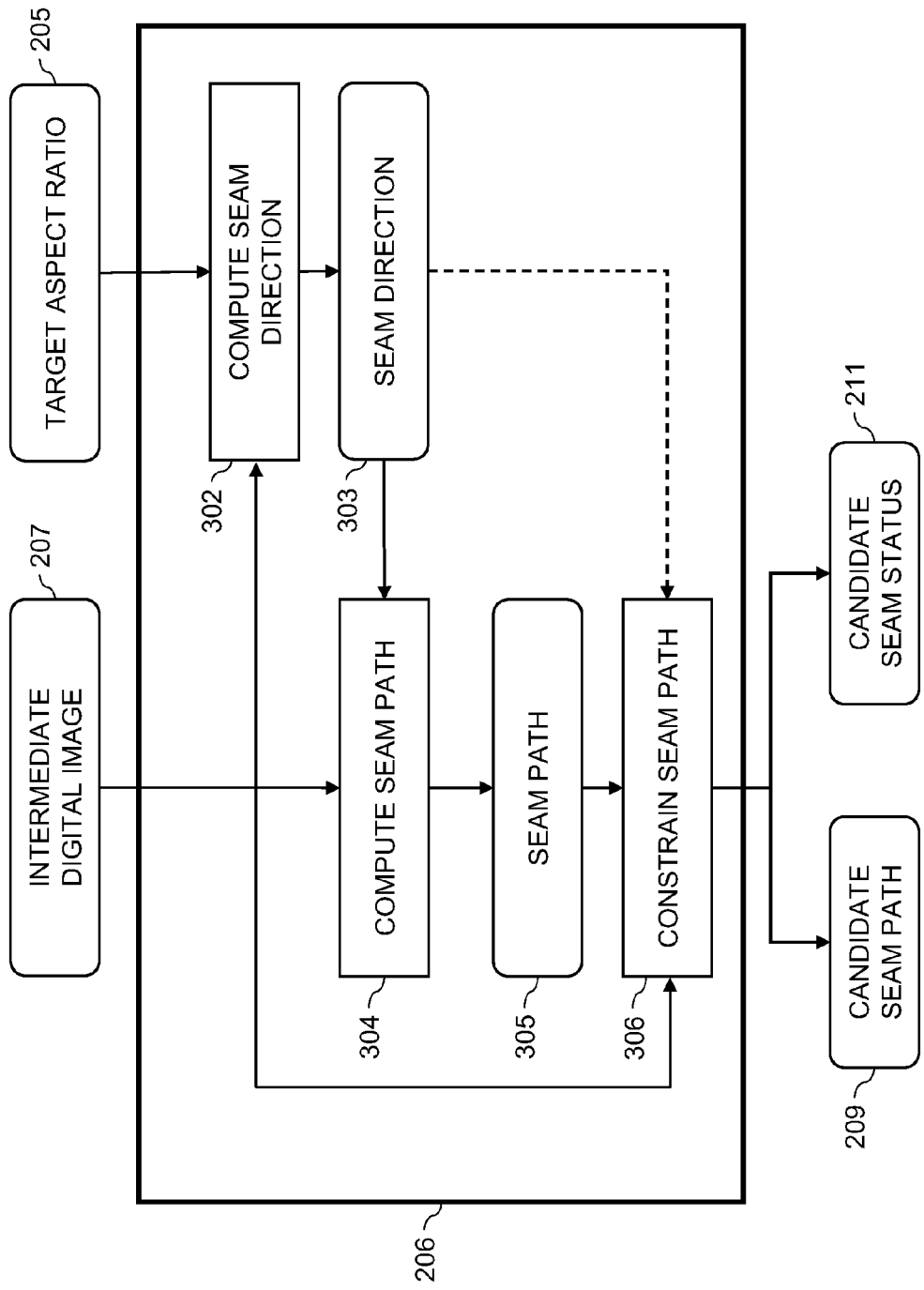
FIG. 3 is a block diagram showing a detailed view of the get candidate seam path step of FIG. 2.

The individual steps outlined in FIG. 2 will now be described in greater detail. FIG. 3 is a more detailed view of the get candidate seam path step 206 of FIG. 2 according to a preferred embodiment of the present invention. Note that optional features shown in this and other figures are represented with dashed lines. A compute seam direction step 302 uses the target aspect ratio 205 and the aspect ratio of the intermediate digital image 207 to determine a seam direction 303. The seam direction 303 contains information specifying whether a row or a column of the intermediate digital image 207 needs to be removed.

A compute seam path step 304 produces a seam path 305 responsive to the intermediate digital image 207 and the seam direction 303. In a preferred embodiment of the present invention, the seam path 305 is computed using a seam carving algorithm such as that described in U.S. Patent Application Publication 2008/0219587, by S. Avidan and A. Shamir, entitled "Method for retargeting images," which is incorporated herein by reference. With this approach, the seam path 305 represents a lowest-energy, connected path of pixels in the direction provided by seam direction 303. The energy of the seam path 305 is computed from an image energy map determined from the intermediate digital image 207.

The image energy map can be computed in any appropriate way known to those skilled in the art. In a preferred embodiment of the present invention, the image energy map is computed from the derivatives of the intermediate digital image 207 (FIG. 2) as described in the aforementioned U.S. Patent Application Publication No. 2008/0219587, and is given by:

$$Emap(x, y) = \left| \frac{\partial}{\partial x} I(x, y) \right| + \left| \frac{\partial}{\partial y} I(x, y) \right| \tag{1}$$

where (x,y) is the pixel location, I(x,y) is the pixel value of the intermediate digital image 207 at pixel location (x,y), $\partial/\partial x$ and $\partial/\partial y$ are the partial derivative operators in the x and y directions, respectively, |•| denotes absolute value operator, and Emap(x,y) is the value of the image energy map at pixel location (x,y). For the case where the intermediate digital image 207 is a color image, the image energy map is preferably determined using a luminance image determined from the intermediate digital image 207 using methods well known in the art.

In a preferred embodiment of the present invention, the energy associated with the seam path of pixels is determined by summing up the image energy map values for the connected path of pixels that lie along the seam path.

$$E_s = \Sigma_s Emap(x_s, x_s) \tag{2}$$

where the summation is carried out for all of the points on a seam path 305, $(x_s, y_s)$ is the location of a point on the seam path 305, and $E_s$ is the seam path energy. The compute seam path step 304 determines the seam path 305 having the minimum seam path energy. This can be done using any optimization process known in the art, such as the optimization process described in the aforementioned U.S. Patent Application Publication No. 2008/0219587.

Generally, an initial point is selected on the boundary of the image as the starting location of the seam path 305. The seam path 305 is then extended from this point in the direction that minimizes the energy, crossing the intermediate digital image 207 (FIG. 2) in the seam direction 303. The initial point can be a predetermined point such as a corner point of the image or a center point of one of the edges. Alternately, the initial point can also be determined by selecting an edge location having a minimum energy, or corresponding to a row (column) of the image having the lowest average energy.

Figure 4:
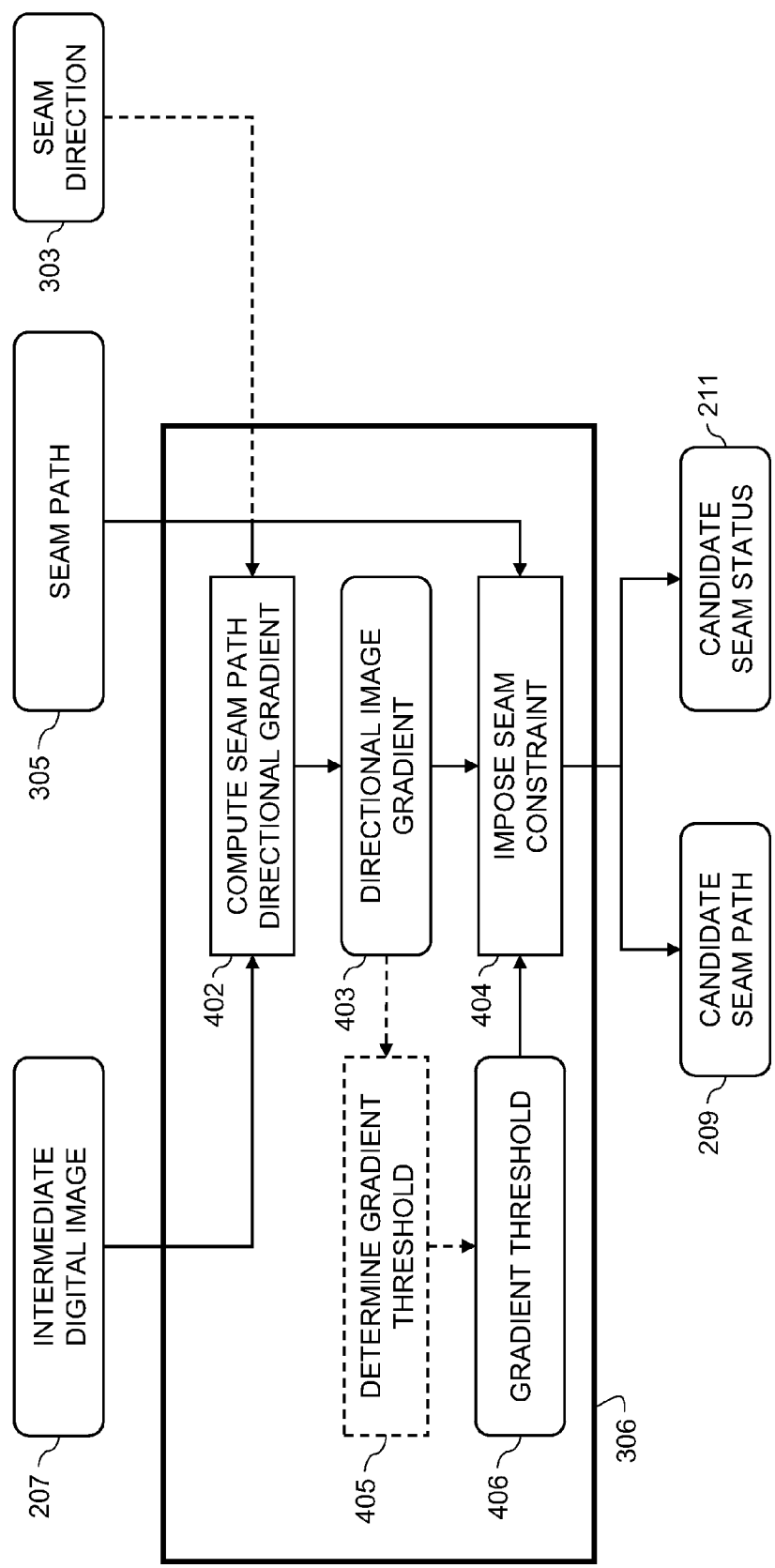
FIG. 4 is a block diagram showing a detailed view of the constrain seam path step of FIG. 3.

A constrain seam path step 306 is used to place constraints on the seam path to ensure that the seam path does not pass through portions of the intermediate digital image 207 that contain important image content. FIG. 4 is a more detailed view of the constrain seam path step 306 shown in FIG. 3 according to a preferred embodiment of the present invention. A compute seam path directional gradient step 402 uses the intermediate digital image 207 and the seam path 305 to compute a directional image gradient 403 perpendicular to the seam path 305, or alternately perpendicular to the seam direction 303. The directional image gradient can be computed in any appropriate way known to those skilled in the art. One way to compute the directional image gradient according to a preferred embodiment of the present invention can be described using Eq. (3) below:

$$e(x,y) = |I(x,y) - I(x',y')| \quad (3)$$

where (x,y) and (x',y') are neighboring pixel locations lying on a line perpendicular to the seam direction 303 (or the seam path 305), I(x,y) and I(x',y') are the pixel values of the intermediate digital image 207 at pixel locations (x,y) and (x',y'), respectively, |•| denotes absolute value operator, and e(x,y) is the value of the directional image gradient at pixel location (x,y).

An impose seam constraint step 404 uses the directional image gradient 403 and the seam path 305 to impose constraints on the seam path 305, producing the candidate seam path 209 and the candidate seam status 211. In a preferred embodiment of the present invention, the impose seam constraint step 404 is implemented by constraining the directional image gradient to be less than a gradient threshold 406 for each pixel along the candidate seam path 209. The gradient threshold 406 is a threshold value specifying a maximum allowable value for the directional image gradient 403 along the candidate seam path 209.

The gradient threshold can be determined in any appropriate way known to those skilled in the art. In one embodiment of the present invention, the gradient threshold 406 is a predetermined constant. However, it has been found that in many cases, it is preferable for the gradient threshold 406 to be image dependent. A user interface can be provided allowing the user to specify a heuristically determined gradient threshold 406 that works best for a particular image. In a preferred embodiment of the present invention, a determine gradient threshold step 405 is used to determine the gradient threshold 406 responsive to the directional image gradient 403. This can be done by computing a cumulative distribution of the directional image gradient 403 values and then selecting a gradient threshold 406 corresponding to a certain cumulative percentage (e.g., 80%). In this way, the candidate seam path 209 can be selected to avoid the areas of the intermediate digital image 207 that have the highest directional image gradient 403.

The impose seam constraint step 404 imposes the constraint condition that the directional image gradient 403 be less than the gradient threshold 406 along the candidate seam path 209. First, the seam path 305 determined by the compute seam path step 304 (FIG. 3) is checked to see if it violates the constraint condition. If the seam path 305 is found to satisfy the constraint condition, then the candidate seam path 209 is set to be equal to the seam path 305 and the candidate seam status 211 is flagged as "TRUE". However, if the seam path 305 is found to violate the constraint condition, then the seam path 305 is perturbed to find a candidate seam path 209 that satisfies the constraint condition. In one embodiment of the present invention, the seam path 305 is perturbed by adjusting the starting location for the seam path 305 and then calculating a new seam path 305 through that starting point as described above with reference to the compute seam path step 304. If no candidate seam path 209 is identified that satisfies the constraint condition after a predetermined number of attempts, then the search to find the candidate seam path 209 is terminated and the candidate seam status 211 is flagged as "FALSE".

The valid seam test 213 of FIG. 2 checks the value of the candidate seam status 211 and invokes resize image step 210 if the candidate seam status 211 is "FALSE" and otherwise invokes the remove seam step 208.

The resize image step 210 uses intermediate digital image 207 and the target aspect ratio 205 to produce the final retargeted digital image 219 using a conventional non-seam-carving method such as image cropping or scaling. In one embodiment of the present invention, an image cropping algorithm is applied to the intermediate digital image 207 to remove the necessary number of rows and columns from the edges of the intermediate digital image 207 to meet the target aspect ratio 205. In the simplest embodiment, the resize image step 210 crops the final retargeted digital image 219 from the center of the intermediate digital image 207. In another embodiment, methods that will be well-known to one skilled in the art are used to determined a visual saliency map for the intermediate digital image 207. The visual saliency map is an indication of the visual importance of the image content as a function of position within the image. For example, regions of an image that are determined to contain a face would generally be considered to have a high level of image saliency. After the saliency map is constructed, the intermediate digital image 207 can be cropped to retain the most important image content.

In an alternate embodiment of the present invention, the resize image step 210 uses a scaling operation to produce the final retargeted digital image 219 having the target aspect ration. In this case, an interpolation algorithm is used to resample the intermediate digital image 207 in either the horizontal or vertical direction as appropriate. Any type of interpolation algorithm known in the art can be used including nearest neighbor interpolation, linear interpolation or cubic interpolation. This approach can produce acceptable results if the resize image step 210 does not need to change the aspect ratio by a significant degree. If this approach is used for large aspect ratio changes, the proportions of objects in the image may be altered to the point where it becomes objectionable. When the aspect ratio of the intermediate digital image 207 is not sufficiently close to the target aspect ratio, then it will generally be preferable to use a different resizing method.

In yet another embodiment of the present invention, the resize image step 210 uses a combination of cropping and scaling. In this case, a visual saliency map can be determined for the intermediate digital image 207. A cropping step is then applied to crop the image to the extent possible given the constraint that no highly important image regions are removed. A scaling step is then used to complete the resizing operation if it was not possible to crop the image all the way to the target aspect ration 205.

The remove seam step 208 of FIG. 2 removes the pixels of the intermediate digital image 207 along the candidate seam path 209 to produce a retargeted digital image 215. In one embodiment of the present invention, the pixels along the candidate seam path 209 are simply removed and the remaining image pixels are shifted to close up the seam. However, this can result in visible artifacts along the seam in some cases. In a preferred embodiment of the present invention, the image pixels of the retargeted digital image 215 in a neighborhood near the image pixels on the candidate seam path 209 are modified using the values of the removed image pixels. The pixel values can be modified in any appropriate way known to those skilled in the art. In a preferred embodiment of the present invention, the pixels of the retargeted digital image 215 adjacent to the candidate seam path 209 are replaced by the average of the original image pixel values at those locations and the adjacent removed image pixel values.

Figure 5:
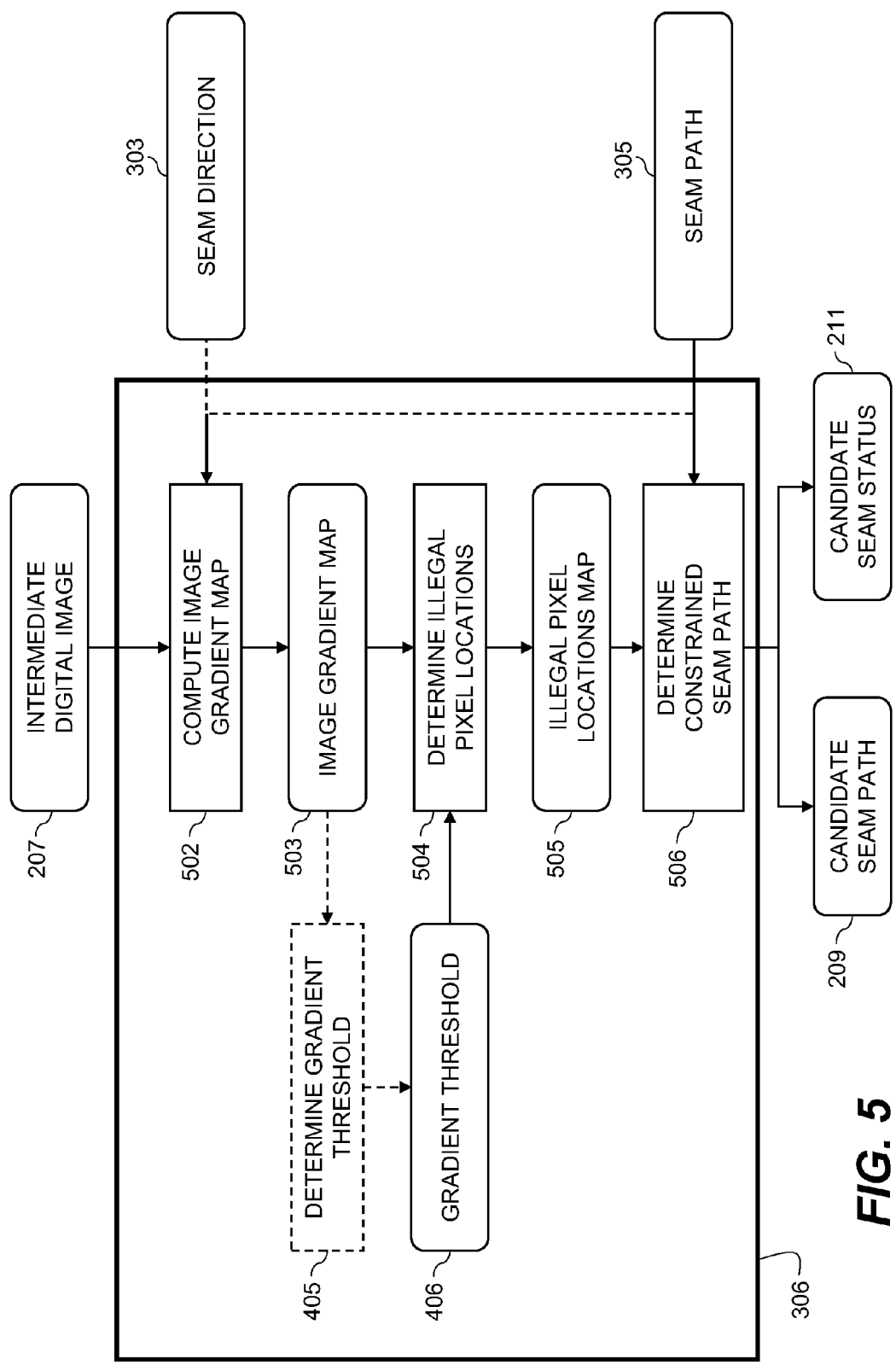
FIG. 5 is a block diagram showing a detailed view of the constrain seam path step of FIG. 3 for an alternate embodiment of the present invention.

FIG. 5 shows an alternate embodiment of the constrain seam path block 306 (FIG. 3). A compute image gradient map step 502 uses the intermediate digital image 207 and the seam direction 303 (or the seam path 305) to compute an image gradient map 503 comprising a directional image gradient perpendicular to the seam direction 303 (or the seam path 305). The image gradient map 503 can be computed in any appropriate way known to those skilled in the art. In a preferred embodiment of the present invention, the directional image gradient given in Eq. (3) is used to compute the image gradient map 503.

Next, a determine illegal pixel locations step 504 uses the image gradient map 503 produced by compute image gradient map step 502 to determine an illegal pixel locations map 505. The illegal pixel locations can be computed in any appropriate way known to those skilled in the art. One way to compute the illegal pixel locations according to a preferred embodiment of the present invention can be described using the following equation:

$$IM(x, y) = \begin{cases} 0 & \text{if } e(x, y) \le \eta \\ 1 & \text{otherwise} \end{cases} \quad (4)$$

where $e(x,y)$ is the image gradient map 503, $\eta$ is a gradient threshold 406, and $IM(x,y)$ is the value of illegal pixel location map, where $IM(x,y)=0$ indicates legal pixel locations and $IM(x,y)=1$ indicates illegal pixel locations. The gradient threshold 406 can be determined in any appropriate way known to those skilled in the art. As described above with reference to FIG. 4, in a preferred embodiment of the present invention a determine gradient threshold step 405 can be used to determine the gradient threshold 406 responsive to the image gradient map 503.

Next, a determine constrained seam path step 506 uses the illegal pixel locations map 505 and the seam path 305 to determine the candidate seam path 209. In a preferred embodiment of the present invention, the determine constrained seam path step 506 is implemented by constraining the seam path 305 to not pass through any illegal pixel locations.

The determine constrained seam path step 506 imposes the constraint that the candidate seam path 209 not pass through any illegal pixel locations. First, the seam path 305 determined by the compute seam path step 304 (FIG. 3) is checked against the illegal pixel locations map 505 to see if it violates passes through any illegal pixel locations. If the seam path 305 is found to satisfy the constraint condition, then the candidate seam path 209 is set to be equal to the seam path 305 and the candidate seam status 211 is flagged as "TRUE". However, if the seam path 305 is found to pass through any illegal pixel locations, then the seam path 305 is perturbed to find a candidate seam path 209 that does not pass through any illegal pixel locations. In one embodiment of the present invention, the seam path 305 is perturbed a fixed number of times by adjusting the starting location for the seam path 305. If no candidate seam path 209 is identified that satisfies the constraint condition within the fixed number of attempts, then the search for the candidate seam path 209 is stopped and the candidate seam status 211 is flagged as "FALSE".

Figure 6:
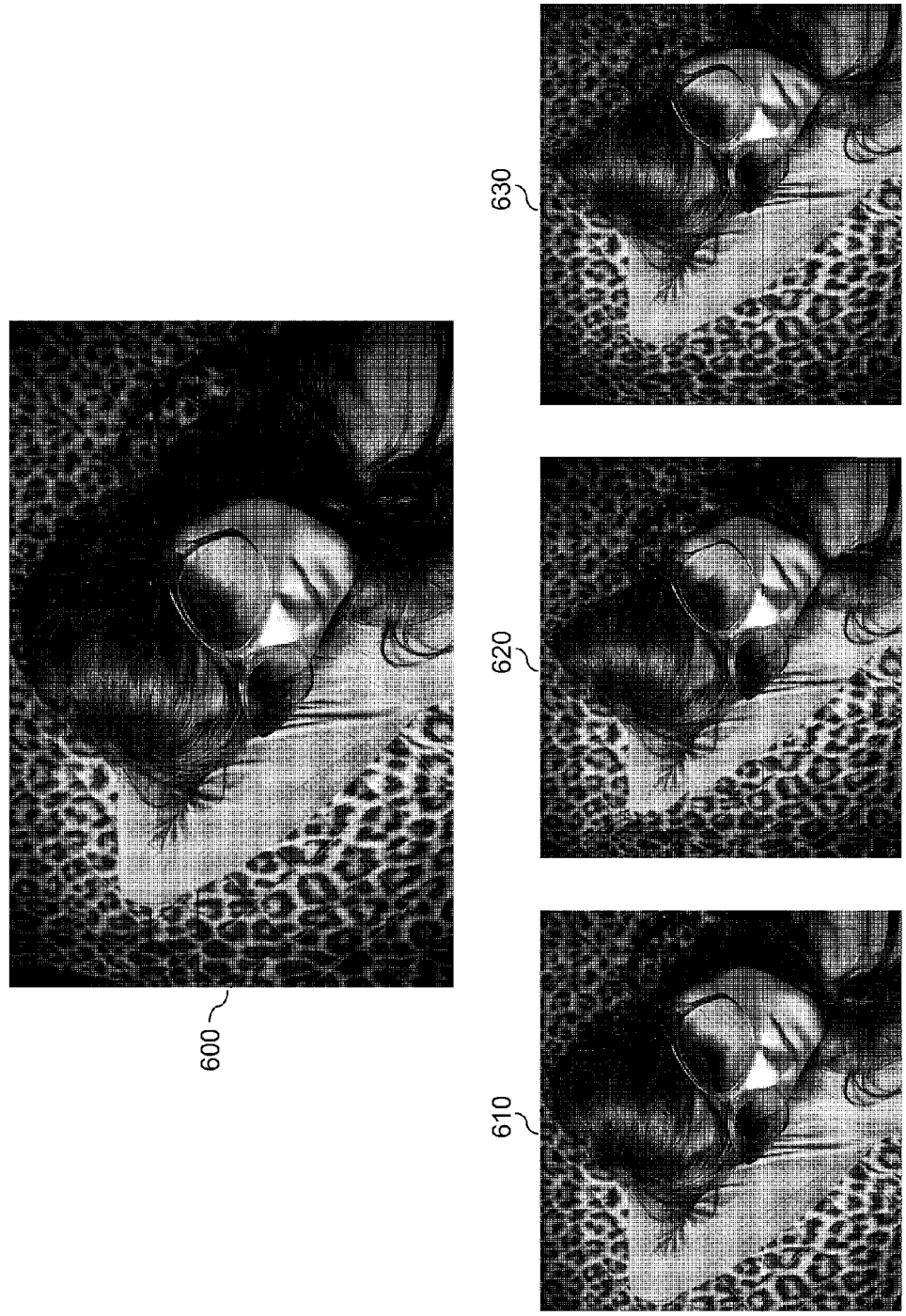
FIG. 6 shows a comparison of the results obtained according to an embodiment of the present invention with those obtained using alternate techniques.

FIG. 6 shows an example of a source digital image 600. A retargeted digital image 610 is shown where the number of columns has been reduced by 27% according to the present invention. Out of 27%, the first 8% of the columns were removed using the seam carving approach via the remove seam step 208. The resize image step 210 was used to remove the remaining 19% of the columns. Two alternative retargeted digital images 620 and 630 are also shown for comparison. Alternative retargeted digital images 620 was determined according to the seam carving algorithm described in the aforementioned U.S. Patent Application Publication 2008/0219587. Alternative retargeted digital images 630 was determined using the method of U.S. patent application Ser. No. 12/576,260, entitled: "Improved Seam Carving for Image Resizing", by Kumar, et al. It can be seen that the alternative retargeted digital images 620 and 630 both contain objectionable image distortions, which can result when important image content is removed during the seam carving process. Since there were no available seams that passed through unimportant image regions, the alternative approaches were forced to remove seam paths that passed through important image content. The retargeted digital image 610 determined using the method of the present invention has the advantage that it avoids introducing distortions into the image by preserving the important content.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST

110 Data processing system
120 Peripheral system
130 User interface system
140 Data storage system
201 Initialize intermediate digital image
202 Receive input digital image step
203 Input digital image
204 Receive target aspect ratio step
205 Target aspect ratio
206 Get candidate seam path step
207 Intermediate digital image
208 Remove seam step
209 Candidate seam path
210 Resize image step
211 Candidate seam status
213 Valid seam test
215 Retargeted digital image
217 Aspect ratio met
219 Final retargeted digital image
302 Compute seam direction step
303 Seam direction 304 Compute seam path step
305 Seam path
306 Constrain seam path step
402 Compute seam path directional gradient step
403 Directional image gradient
404 Impose seam constraint step
405 Determine gradient threshold step
406 Gradient threshold
502 Compute image gradient map step
503 Image gradient map
504 Determine illegal pixel locations step
505 Illegal pixel locations map
506 Determine constrained seam path step
600 Source digital image
610 Retargeted digital image
620 Alternative retargeted digital image
630 Alternative retargeted digital image

What is claimed is:

1. A method for resizing an input digital image with an input aspect ratio to form an output digital image with an output aspect ratio, comprising:
 a) determining a number of rows or columns that need to be reduced from the input digital image to form an output digital image with the output aspect ratio;
 b) selecting either a horizontal seam direction when the number of rows needs to be reduced or a vertical seam direction when the number of columns needs to be reduced;
 c) using a processor to determine an image energy map for the input digital image;
 d) defining a gradient threshold;
 e) using a processor to repeatedly determine a seam path responsive to the image energy map and remove pixels along the determined seam path to determine the output digital image, wherein the determined seam path satisfies a constraint that a directional image gradient computed in a direction perpendicular to either the seam path or the seam direction is less than the gradient threshold for each pixel in the seam path, until either the determined number of rows or columns has been reduced or no valid seam path can be found which satisfies the constraint; and
 f) cropping or scaling the output digital image to the output aspect ratio if the determined number of rows or columns was not reduced in step e).

2. The method of claim 1 where step e) includes modifying the output image pixels in a neighborhood near removed pixels along the seam path using the values of the removed pixels.

3. The method of claim 2 where the values of output image pixels adjacent to the seam path are replaced by the average of the original image pixel values and the adjacent removed image pixel values.

4. The method of claim 1, where the output digital image is scaled in step f) when the aspect ratio of the output digital image is sufficiently close to the output aspect ratio.

5. The method of claim 1, where the output digital image is cropped in step f) by removing equal portions of the output image from either top and bottom sides of the image or left and right sides of the image.

6. The method of claim 1, where the output digital image is cropped in step f) by determining a visual saliency map representing an estimated importance of the image content in the output digital image and removing portions of the output image having lower importance.

7. The method of claim 1 wherein the image energy map is computed by:

$$Emap(x, y) = \left|\frac{\partial}{\partial x}I(x, y)\right| + \left|\frac{\partial}{\partial y}I(x, y)\right|$$

where (x,y) is the pixel location, I(x,y) is the pixel value of the input digital image at pixel location (x,y), $\partial/\partial x$ and $\partial/\partial y$ are the partial derivative operators in the x and y directions, respectively, |•| denotes absolute value operator, and Emap(x,y) is the value of the image energy map at pixel location (x,y).

8. The method of claim 1 wherein the gradient threshold is determined responsive to a distribution of directional image gradient values.

9. The method of claim 1 wherein a determination that no valid seam path can be found is made after a predetermined number of attempts are made to find a seam path that satisfies the constraint that a directional image gradient computed in a direction perpendicular to either the seam path or the seam direction is less than the gradient threshold for each pixel in the seam path.

10. The method of claim 1 wherein the directional image gradient is computed in a direction perpendicular to the seam direction and step e) further includes:
 i) determining an image gradient map where the gradient is a directional image gradient computed in a direction perpendicular to the seam direction;
 ii) thresholding the image gradient map with the gradient threshold to determine illegal pixel locations; and
 iii) determining a seam path responsive to the image energy map, where the seam path does not pass through any illegal pixel locations.

11. The method of claim 1 wherein the input image is a color input image and the seam path is determined using a luminance image determined from the color input image.

12. A system comprising:
 a data processing system; and
 a memory system communicatively connected to the data processing system and storing instructions configured to cause the data processing system to implement a method for resizing an input digital image with an input aspect ratio to form an output digital image with an output aspect ratio, wherein the instructions comprise:
 a) determining a number of rows or columns that need to be reduced from the input digital image to form an output digital image with the output aspect ratio;
 b) selecting either a horizontal seam direction when the number of rows needs to be reduced or a vertical seam direction when the number of columns needs to be reduced;
 c) determining an image energy map for the input digital image;
 d) defining a gradient threshold;
 e) repeatedly determining a seam path responsive to the image energy map and removing pixels along the determined seam path to determine the output digital image, wherein the determined seam path satisfies a constraint that a directional image gradient computed in a direction perpendicular to either the seam path or the seam direction is less than the gradient threshold for each pixel in the seam path, until either the determined number of rows or columns has been reduced or no valid seam path can be found which satisfies the constraint; and
 f) cropping or scaling the output digital image to the output aspect ratio if the determined number of rows or columns was not reduced in step e).

* * * * *